(12) United States Patent
Wekhande et al.

(10) Patent No.: US 7,646,616 B2
(45) Date of Patent: Jan. 12, 2010

(54) CAPACITOR CHARGING METHODS AND APPARATUS

(75) Inventors: Shashank S. Wekhande, Nashua, NH (US); Vijay R. Mangtani, Nashua, NH (US); Sihua Wen, Nashua, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 244 days.

(21) Appl. No.: 11/125,300

(22) Filed: May 9, 2005

(65) Prior Publication Data

US 2006/0250824 A1 Nov. 9, 2006

(51) Int. Cl.
H02M 3/335 (2006.01)
(52) U.S. Cl. .................................. 363/21.12; 363/20
(58) Field of Classification Search ............... 363/20, 363/21.12, 30, 56.09
See application file for complete search history.

(56) References Cited

U.S. PATENT DOCUMENTS

| | | | |
|---|---|---|---|
| 5,068,575 A | 11/1991 | Dunsmore et al. | |
| 5,377,091 A | 12/1994 | Faulk | |
| 5,481,178 A | 1/1996 | Wilcox et al. | |
| 5,485,361 A | 1/1996 | Sokal | |
| 5,694,310 A * | 12/1997 | Malik et al. | 363/84 |
| 5,731,694 A | 3/1998 | Wilcox et al. | |
| 5,994,885 A | 11/1999 | Wilcox et al. | |
| 6,061,257 A * | 5/2000 | Spampinato et al. | 363/21.13 |
| 6,100,678 A | 8/2000 | Hobrecht | |
| 6,101,111 A * | 8/2000 | Blair | 363/97 |
| 6,144,194 A | 11/2000 | Varga | |
| 6,188,588 B1 | 2/2001 | Hemena et al. | |
| 6,208,279 B1 | 3/2001 | Oprescu | |

(Continued)

FOREIGN PATENT DOCUMENTS

JP 60154399 A 8/1985

(Continued)

OTHER PUBLICATIONS

PCT Search Report and Written Opinion of the ISA for PCT/US2006/012615 dated Aug. 30, 2006.

(Continued)

*Primary Examiner*—Bao Q Vu
*Assistant Examiner*—Nguyen Tran
(74) *Attorney, Agent, or Firm*—Daly, Crowley, Mofford & Durkee, LLP

(57) ABSTRACT

A capacitor charging circuit is provided with a primary side output voltage sensing circuit for generating a control signal indicative of whether the output voltage has reached a desired level. The control signal is unaffected by voltage spikes occurring when the main switch is turned off. In one embodiment, the circuit filters the primary side voltage for comparison to a reference voltage in order to provide the control signal. In another embodiment, an AND gate provides the control signal indicating that the output voltage has reached the desired level only in response to the primary side voltage being greater than a reference voltage and the secondary current being discontinuous. In a further embodiment, an AND gate provides the control signal indicating that the output voltage has reached the desired levels only in response to a predetermined delay occurring after the primary side voltage becomes greater than a reference voltage and the secondary current being discontinuous. According to a further aspect of the invention, an auxiliary switch is provided to reduce the reverse recovery time of the output diode in order to speed up the capacitor charging time.

6 Claims, 11 Drawing Sheets

U.S. PATENT DOCUMENTS

| | | |
|---|---|---|
| 6,304,066 B1 | 10/2001 | Wilcox et al. |
| 6,307,356 B1 | 10/2001 | Dwelley |
| 6,314,010 B1 | 11/2001 | Markow et al. |
| 6,343,026 B1 | 1/2002 | Perry |
| 6,356,466 B1 | 3/2002 | Smidt et al. |
| 6,518,733 B1 | 2/2003 | Schenkel et al. |
| 6,556,406 B1 * | 4/2003 | Matsunaga et al. .......... 361/100 |
| 6,580,258 B2 | 6/2003 | Wilcox et al. |
| 6,636,021 B2 | 10/2003 | Schenkel et al. |
| 6,674,247 B1 | 1/2004 | Mead et al. |
| 6,674,274 B2 | 1/2004 | Hobrecht et al. |
| 6,958,920 B2 * | 10/2005 | Mednik et al. ................ 363/19 |
| 2002/0190698 A1 * | 12/2002 | Smidt et al. ................. 323/222 |
| 2002/1090698 | 12/2002 | Smidt et al. |
| 2004/0130299 A1 | 7/2004 | Pietkiewicz et al. |
| 2004/0196669 A1 | 10/2004 | Thrap |
| 2004/0196672 A1 | 10/2004 | Toshihiro |
| 2005/0024898 A1 | 2/2005 | Yang et al. |
| 2005/0073862 A1 | 4/2005 | Mednik et al. |
| 2005/0094419 A1 | 5/2005 | Chu et al. |
| 2008/0030178 A1 | 2/2008 | Leonard et al. |

FOREIGN PATENT DOCUMENTS

| | | | |
|---|---|---|---|
| JP | 2000209854 A | | 7/2000 |
| WO | WO 03/065540 A2 | | 8/2003 |
| WO | WO 03/065540 A3 | | 8/2003 |
| WO | WO 2004/042906 | | 5/2004 |

OTHER PUBLICATIONS

Linear Technology Datasheet LT3420/LT3420-1, "Photoflash Capacitor Chargers with Automatic Refresh", 2002, pp. 1-20.

Linear Technology Datasheet LT3468/LT3468-1/LT3468-2, "Photoflash Capacitor Chargers in ThinSOT", 2004, pp. 1-12.

Allegro Microsystems, Inc. Concept Datasheet A8424, "Photoflash Capacitor Charger with IGBT Driver for 2Li + Battery Input System", Feb. 16, 2005, 1-6 pages.

Allegro Microsystems, Inc. Concept Datasheet A8425, "High Current Photoflash Capacitor Charger with IGBT Driver for 2Li + Battery", Feb. 16, 2005, 1-7 pages.

Allegro Microsystems, Inc. Concept Datasheet A8436, "Photoflash Capacitor Charger with IGBT Driver", Mar. 30, 2005, 1-11 pages.

Allegro Microsystems, Inc. Concept Datasheet A8438, "Photoflash Capacitor Charger", Jul. 14, 2004, 1-3 pages.

Allegro Microsystems, Inc. Concept Datasheet A8439, "Photoflash Capacitor Charger", Jul. 14, 2004, 1-3 pages.

International Search Report (Form PCT/ISA/210) and Written Opinion of the International Searching Authority (Form PCT/ISA/237), for PCT/US2007/021932, Jul. 18, 2008, 12 pages.

Offical Action from the Finland Patent Office in Finland Patent Application No. 20070841, dated May 7, 2008, Search Report, and English translation of the Official Action, 9 pages.

Written Opinion and Search Report dated Dec. 8, 2008 for Singapore Patent Application No. 200717334-7, filed Oct. 31, 2007, prepared by the Australian Patent Office, 10 pages.

File downloaded from PAIR for U.S. Appl. No. 11/612,564, filed Dec. 19, 2006, file through Aug. 3, 2009, 404 pages.

Notification Concerning Transmittal of and Copy of International Preliminary Report on Patentability; PCT/US2007/021932 dated Jul. 2, 2009, 7 pages.

* cited by examiner

CAPACITOR CHARGING METHODS AND APPARATUS

CROSS-REFERENCE TO RELATED APPLICATIONS

Not Applicable.

STATEMENT REGARDING FEDERALLY SPONSORED RESEARCH

Not Applicable.

FIELD OF THE INVENTION

The invention relates to capacitor charging circuits and, more particularly to methods and apparatus for charging a camera photoflash capacitor.

BACKGROUND OF THE INVENTION

The use of conventional switch mode power supplies, or converter circuits, for charging capacitive loads, such as a camera photoflash capacitor, is known. U.S. Pat. No. 6,518,733 to Schenkel et al., entitled "Circuits and Techniques for Capacitor Charging Circuits," describes various features of such a circuit. For example, a switch control scheme is described in the '733 Patent with which the main converter switch is controlled based on the transformer primary winding current and the secondary winding current. Specifically, the switch on time is controlled in response to the sensed primary winding current and the switch off time is controlled in response to the sensed secondary winding current. The above-referenced patent also describes sensing the converter output voltage from the primary side of the transformer with a comparator in order to determine when the capacitor is charged to the desired level. One-shot circuitry is used to disable the output of the comparator for an interval at the beginning of each off time of the switch since the voltage spikes occurring when the switch shuts off are not indicative of the actual output voltage.

SUMMARY OF THE INVENTION

According to the invention, apparatus for measuring the output voltage of a capacitor charging circuit having a transformer with a primary winding coupled to a switch and a secondary winding includes a filter coupled to the switch to provide a filtered switch voltage signal and a comparator responsive to the filtered signal and to a reference voltage to provide a control signal indicative of whether the output voltage of the capacitor charging circuit has reached a desired level.

In an alternative embodiment, apparatus for measuring the output voltage of the capacitor charging circuit includes a comparator responsive to the switch voltage and to a reference voltage, a current sensing circuit for sensing a secondary side current level and a logic gate coupled to the output of the comparator and to the current sensing circuit. The logic gate provides the control signal indicating that the output voltage of the capacitor charging circuit has reached the desired level only when both of the following conditions are true: (a) the switch voltage exceeds the reference voltage; and (b) the secondary side current level reaches approximately zero amps.

According to a further alternative embodiment, apparatus for measuring the output voltage of the capacitor charging circuit includes a first comparator responsive to the switch voltage and to a first reference voltage, a delay element coupled to the first comparator to provide a delayed version of the comparator output signal, and a second comparator responsive to the switch voltage and to a second reference voltage. Also provided is a logic gate having a first input coupled to the output of the delay element and a second input coupled to the output of the second comparator and an output at which is provided the control signal indicating that the output voltage of the capacitor charging circuit has reached the desired level only when both of the following conditions are true: (a) a delay has occurred since the switch voltage exceeded the first reference voltage; and (b) the second reference voltage exceeds the switch voltage.

With these arrangements, a capacitor charging circuit is provided with a primary side output voltage sensing circuit for generating a control signal indicative of whether the output voltage has reached the desired level. Advantageously, the control signal is unaffected by voltage spikes occurring on the switch voltage when the switch is turned off.

Also described is apparatus for charging a capacitor and having a transformer with a primary winding coupled to a main switch and a secondary winding coupled to the capacitor through a diode. The apparatus includes an auxiliary switch coupled in parallel with the main switch and adapted to be on when current through the capacitor is less than a predetermined level and off when the capacitor current is greater than the predetermined level. With this arrangement, the reverse recovery time of the diode is reduced, thereby speeding up charging of the capacitor.

BRIEF DESCRIPTION OF THE DRAWINGS

The advantages and aspects of the present invention will be more fully understood in conjunction with the following detailed description and accompanying drawings, wherein.

DETAILED DESCRIPTION

Figure 1:
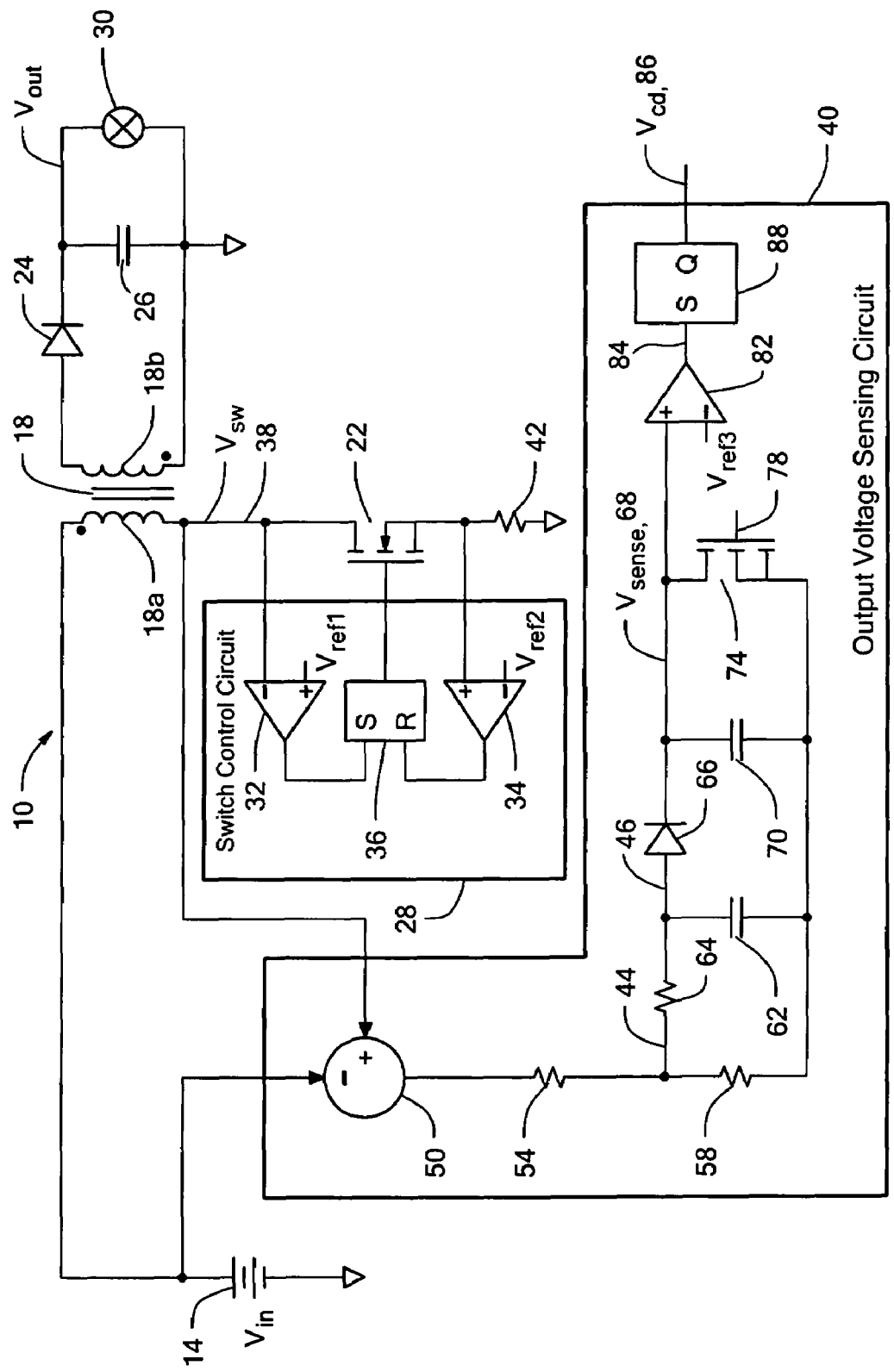
FIG. 1 is a schematic of a capacitor charging circuit having a primary side output voltage sensing circuit according to one aspect of the invention.

Referring to FIG. 1, a capacitor charging circuit 10 includes an input voltage source 14, a transformer 18 having a primary winding 18a and a secondary winding 18b, a main switch 22, a diode 24, and an output capacitor 26, coupled as shown, to supply power to a load 30. The circuit 10 has a flyback topology. The load 30, in the illustrative embodiment, is a camera photoflash and thus, the circuit 10 may be referred to as a photoflash charger or charging circuit. Typical photoflash voltage requirements vary from approximately 0 to 300 volts. The input voltage source 14 may, for example, be a battery, such as an Alkaline, NiMH, or Lithium battery, providing a voltage in the range between approximately 1.8 and 5.0 volts in the illustrative embodiment.

In operation, when the switch 22 is on, energy is stored in the primary winding 18a of the transformer. During this time, the diode 24 is reverse-biased and no current is delivered to the output capacitor 26. When the switch turns off, the diode 24 becomes forward-biased and energy is transferred from the transformer secondary winding 18b to the output capacitor 26.

The capacitor charging circuit 10 includes a switch control circuit 28 for generating a control signal for the switch 22 which may be a MOSFET device. The control signal causes the switch to turn on and off until the output voltage Vout across the capacitor 26 reaches a desired level, such as 300 volts in the illustrated embodiment, preferably at an adaptive rate rather than at a fixed frequency. Once the output voltage Vout reaches the desired level, an indication is typically provided to the camera user that the photoflash 30 may be activated. When the user activates the photoflash 30, energy is transferred from the output capacitor 26 to the load.

The switch control circuit 28 includes a first comparator 32 having an inverting input coupled to the switch voltage Vsw at node 38 and a non-inverting input responsive to a reference voltage Vref1. A flip-flop, or latch 36 has a set input provided by the output signal of comparator 32. A second comparator 34 has a non-inverting input coupled to a resistor 42 provided to sense the primary winding current and an inverting input responsive to a reference voltage Vref2. The output of comparator 34 is coupled to the reset input of latch 36. The output of latch 36 is coupled to the gate of switch 22, as shown.

In operation, the on time portion of each switch cycle is controlled by the primary winding current level as sensed by resistor 42. In particular, when the primary winding current reaches a predetermined level, as established by reference voltage Vref2, the output of comparator 34 goes high, thereby resetting the latch 36 and causing the switch control signal to go low to shut off the switch 22. The reference voltage level Vref2 is selected (and in fact, may be user selectable) in order to provide a particular input current limit. When the switch voltage Vsw falls to the level of reference voltage Vref1, the output of comparator 32 goes high causing the latch output to go high and turn on switch 22.

The reference voltage Vref1 provided to comparator 32 is selected in order to cause the switch 22 to turn on once the secondary current has become discontinuous (i.e., passed through zero amps) in order to have the circuit operate near the continuous/discontinuous boundary, thereby achieving high flyback conversion efficiency. The level of the reference voltage Vref1 does not correlate to any particular secondary current level, but is selected only to ensure that the output of comparator 32 transitions only after the secondary current becomes discontinuous. In fact, the secondary current level occurring when the switch voltage Vsw reaches the level of reference voltage Vref1 will depend on various factors, including the transformer leakage inductance and parasitic capacitance.

It will be appreciated by those of ordinary skill in the art that various alternative schemes for controlling the switch 22 are possible. For example, the above-referenced U.S. Pat. No. 6,518,733 describes a switch control scheme in which the switch on time is controlled in response to sensed primary winding current and the off time is controlled in response to sensed secondary winding current. A further alternative scheme, in which the on time is controlled in response to the primary winding current and the off time is controlled in response to sensed output capacitor current, is described below in conjunction with FIGS. 4 and 5.

According to one aspect of the invention, the charger 10 includes an output voltage sensing circuit 40 for sensing the converter output voltage Vout from the primary side of the transformer, as is desirable in order to avoid the high power dissipation generally associated with secondary side voltage sensing in high output voltage circuits. The output voltage sensing circuit 40 includes a summing element 50, a level shifter in the form of a resistor divider comprising resistors 54 and 58, a resistor 64 and capacitor 62 for averaging the level-shifted switch voltage Vsw over a cycle during the off time of switch 22, a diode 66 and capacitor 70 for sampling and holding the filtered signal, and a switch 74, all coupled as shown.

The summing element 50 has a non-inverting input coupled to the circuit node 38, an inverting input coupled to the input voltage source Vin, and an output coupled to resistor 54. The voltage at the junction of resistors 54 and 58 (i.e. at circuit node 44) is proportional to the output voltage Vout when the switch 22 is off. The voltage at circuit node 44 is averaged by resistor 64 and capacitor 62 in order to eliminate the effect of voltage spikes occurring at the circuit node 38 when the switch 22 turns off. The voltage spikes are attributable to current ringing through the transformer leakage inductance and the parasitic capacitance of the switch 22. The filtered voltage at circuit node 46 is sampled and held by diode 66 and capacitor 70 to provide a DC voltage, Vsense, that is proportional to the output voltage Vout when the switch 22 is off and that is unaffected by the voltage spikes occurring at circuit node 38 when the switch 22 turns off. Thus, components 64 and 62 (and also capacitor 70) function to filter or waveshape the voltage at node 44 so that the Vsense voltage in an accurate indication of the output voltage Vout, having eliminated the affects of the leakage inductance ringing and the resulting voltage spikes on the switch voltage Vsw. It will be appreciated by those of ordinary skill in the art that resistor 64 may be realized as a combination of resistors 54 and 58.

The Vsense voltage is coupled to a comparator 82 for comparison to a reference voltage, Vref3, to provide a control signal 84 that is indicative of whether the output voltage Vout has reached a desired, fully charged level. The control signal 84 sets a latch 88, the output of which provides a "charge done" signal Vcd, 86 in the form of a pulse to indicate a fully charged capacitor condition only in response to one edge of the control signal 84, such as the rising edge as illustrated. The reference voltage Vref3 is selected so that the Vsense voltage exceeds the reference voltage when the output voltage Vout reaches the desired level.

In one illustrative embodiment, the charger 10 shuts down when the charge done signal Vcd indicates that the output voltage has reached the desired level. It will be appreciated that other appropriate action may be taken in response to the charge done signal Vcd, such as implementing a refresh feature described in the above-referenced U.S. Pat. No. 6,518,733.

The values of the resistor 64 and capacitors 62 and 70 are selected to average the level-shifted switch voltage at node 44 so as to remove at least the majority of the voltage spikes that occur when the switch turns off. Additional factors to consider when selecting the value of the filter components include the nominal output voltage level, the level of reference voltage Vref3, the turns ratio of the transformer, and whether the components are discrete or incorporated in an integrated circuit (since in the later case, keeping capacitor values small is critical) to name a few. In one illustrative embodiment, the RC time period due to resistors 54, 58, 64 and the parallel combination of capacitors 62 and 70 to reach Vref3 is selected to be on the order of one-quarter of the nominal switch off time.

The sample and hold diode 66 and capacitor 70, referred to alternatively as a peak charging circuit, may be eliminated depending on the speed of the comparator 82. If the comparator 82 is fast enough, the time varying smoothed signal at node 46 may be coupled directly to the comparator input. In the preferred embodiment however, peak charging elements 66 and 70 are used to provide the DC Vsense voltage to the input of comparator 82, as shown.

A switch 74, such as may be a MOSFET device for example, is coupled in parallel with capacitor 70, as shown. Switch 74 is turned on by a control signal 78, thereby discharging capacitor 70, whenever either one of the following conditions occur: (1) the photoflash 30 is activated; or (2) the output voltage Vout reaches the desired level, as determined by the Vsense voltage exceeding the reference voltage Vref3.

Figure 1A:
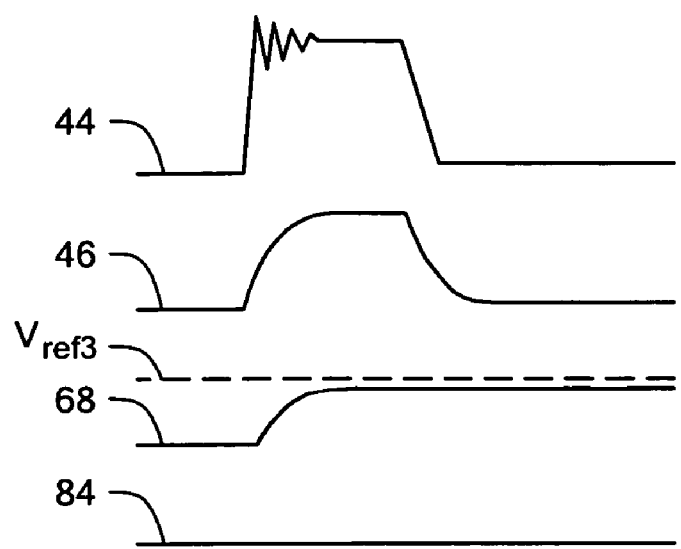
FIG. 1A shows several waveforms associated with the charging circuit of FIG. 1 when the output voltage has not yet reached the desired level.

Referring also to FIG. 1A, various waveforms are shown to illustrate operation of voltage sensing circuit 40 when the output voltage Vout has not reached the desired level. Waveform 44 shows the level-shifted switch voltage at circuit node 44, waveform 46 shows the filtered voltage at circuit node 46, and waveform 68 shows the peak charged Vsense voltage at node 68. Also shown is the reference voltage Vref3 being greater than the Vsense voltage 68, thereby indicating that the output voltage Vout has not yet reached the desired level. Thus, the control signal 84 at the output of comparator 82 remains at a logic low level.

Figure 1B:
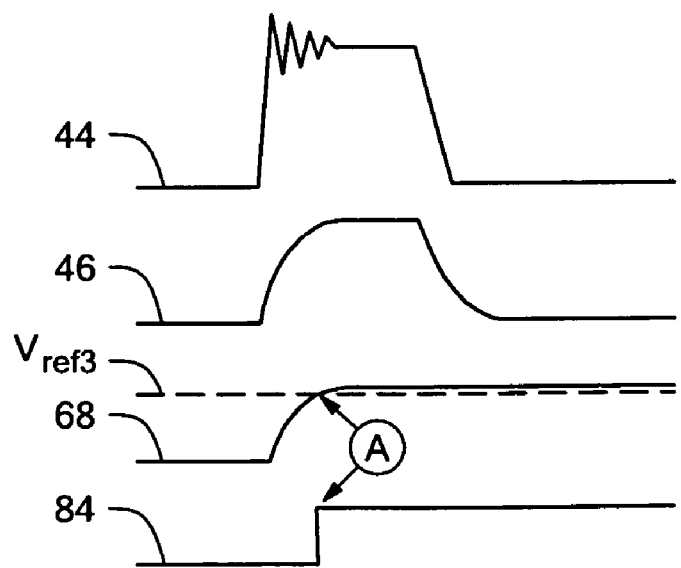
FIG. 1B shows several waveforms associated with the charging circuit of FIG. 1 when the output voltage has reached the desired level.

Referring also to FIG. 1B, the same waveforms as in FIG. 1A are shown. Here however, the output voltage Vout has reached the desired level, as indicated by the Vsense voltage 68 exceeding the Vref3 voltage at time A. Thus, the control signal 84 transitions to a logic high level at time A, as shown.

Figure 2:
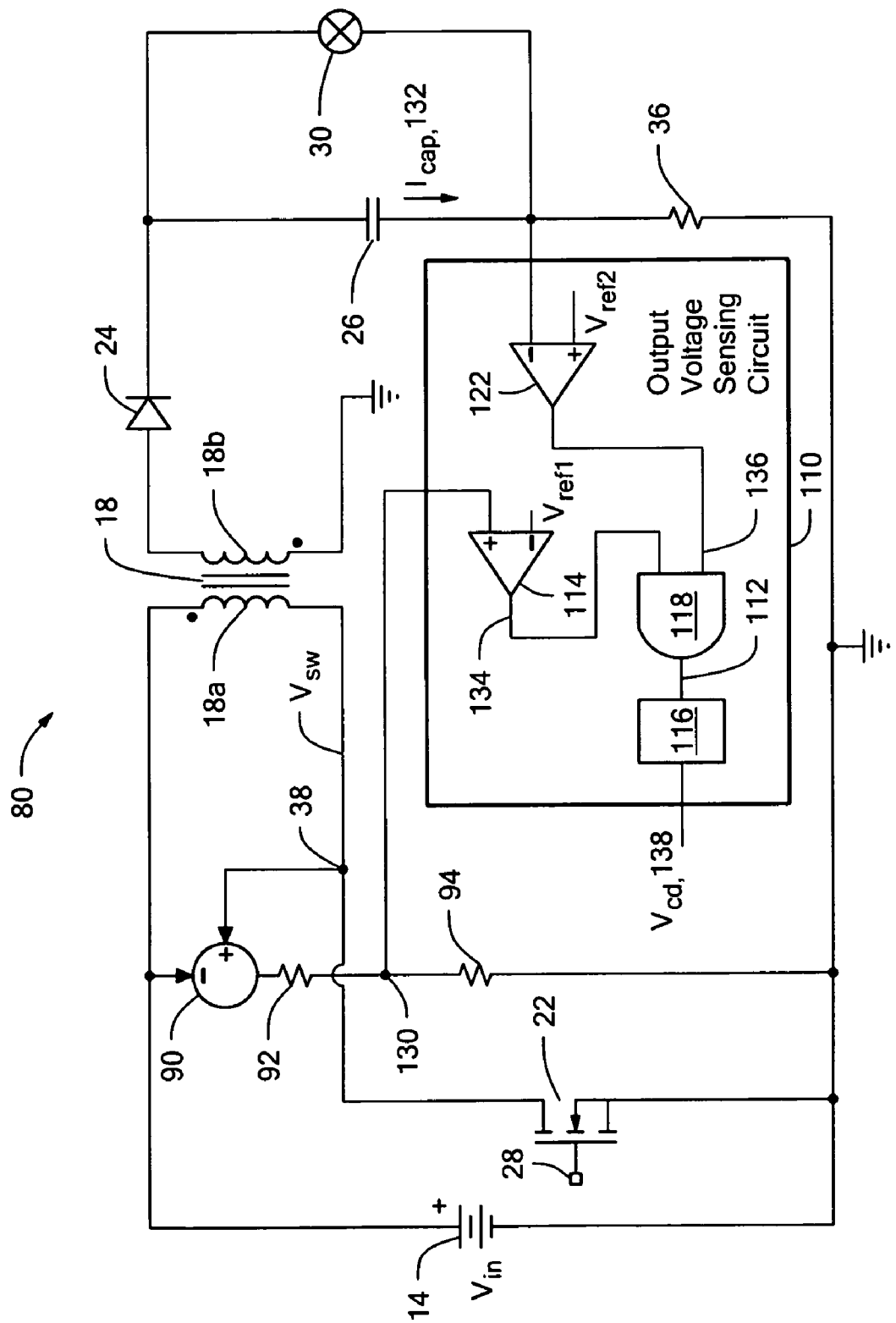
FIG. 2 is a schematic of an alternative embodiment of the capacitor charging circuit of FIG. 1 having an alternative primary side output voltage sensing circuit.

Referring to FIG. 2, an alternative capacitor charging circuit 80 is shown, in which like reference numbers refer to like elements. Circuit 80 thus includes input voltage source 14, transformer 18, switch 22, switch control circuit 28 (here simplified for ease of illustration), diode 24, and output capacitor 26. The charging circuit 80 differs from the charger 10 of FIG. 1 in that circuit 80 includes an alternative output voltage sensing circuit 110 with which the converter output voltage Vout is sensed from the primary side of the transformer.

Circuit 80 also includes a resistor 36 coupled in series between the output capacitor 26 and ground for sensing the current Icap, 132 through the output capacitor 26. The voltage across the resistor 36 is proportional to the capacitor current Icap. The capacitor current Icap is sensed for use by the output voltage sensing circuit 110, as will be described.

The output voltage sensing circuit 110 includes a summing element 90 and a level shifter in the form of a resistor divider comprising resistors 92 and 94. The summing element 90 has a non-inverting input coupled to the circuit node 38, an inverting input coupled to the input voltage source Vin, and an output coupled to resistor 92. The voltage at the junction of resistors 92 and 94 (i.e., at node 130) is proportional to the output voltage Vout when the switch 22 is off.

The output voltage sensing circuit 110 also includes a first comparator 114 having a non-inverting input coupled to node 130 at the junction of resistors 92 and 94 and an inverting input responsive to a reference voltage Vref1. The output signal 134 of comparator 114 is coupled to an input of an AND gate 118. Comparator 114 senses when the output voltage Vout reaches a desired level. Thus, reference voltage Vref1 is selected to correspond, via the transformer turns ratio and resistor divider ratio (of resistors 92 and 94), to desired fully charged capacitor voltage. In one illustrative embodiment, the desired output voltage is 300 volts and the reference voltage Vref1 is 5 volts or Vin.

A second comparator 122 has an inverting input coupled to the current sense resistor 36, a non-inverting input responsive to a reference voltage Vref2, and provides an output signal 136 coupled to an input of AND gate 118, as shown. Comparator 122 senses when the capacitor current Icap, 132 becomes very small, for example about 10% of its peak value. To this end, the reference voltage Vref2 is generally at several tens of milliamps multiplied by the resistance of resistor 36 above ground to account for propagation delay or other non-ideal effects.

The output signal 112 of AND gate 118 provides a control signal that indicates that the output voltage Vout has reached the desired level when both of the following conditions are true: the output voltage Vout has reached the desired voltage level as established by reference voltage Vref1 and the output capacitor is fully charged for a given switch cycle as determined by the capacitor current becoming discontinuous as sensed by resistor 36. In particular, the control signal 112 is high only when the output of both comparator 114 and comparator 122 are high. The control signal 112 sets a latch 116, the output of which provides a charge done signal Vcd, 138 in the form of a pulse at each rising edge of the control signal 112, such as may be used to shut down the charger 80.

Figure 2A:
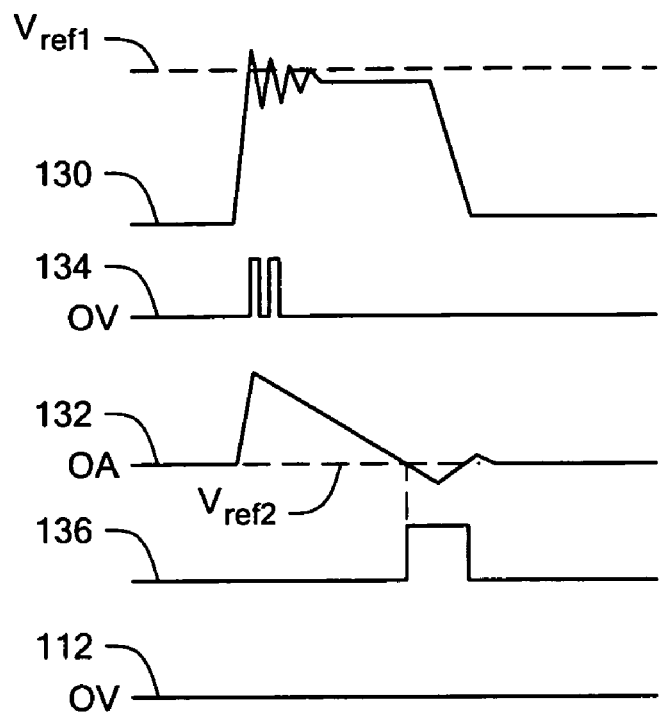
FIG. 2A shows several waveforms associated with the charging circuit of FIG. 2 when the output voltage has not yet reached the desired level.

Referring also to FIG. 2A, several waveforms associated with the circuit 80 are shown to illustrate operation of the voltage sensing circuit 110 when the output voltage Vout has not reached the desired level. In particular, waveform 130 shows the level-shifted switch voltage at node 130 and waveform 132 shows the capacitor current Icap. Waveform 134 shows the output signal of comparator 114, waveform 136 shows the output signal of comparator 122, and waveform 112 shows the control signal 112 at the output of AND gate 118.

Also shown is the reference voltage Vref1 being greater than the level-shifted switch voltage 130 once the voltage spikes occurring when the switch 22 turns off have dissipated, thereby indicating that the output voltage Vout has not yet reached the desired level. However, some of the peaks of the voltage spikes do exceed the reference voltage Vref1 and thus, the output signal 134 of comparator 114 transitions accordingly, as shown. When the capacitor current 132 becomes very small, the output signal 136 of comparator 122 goes high. However, since the output signal 134 of comparator 114 is low, the control signal 112 remains low, as is desired since the output voltage Vout has not reached the desired level.

Figure 2B:
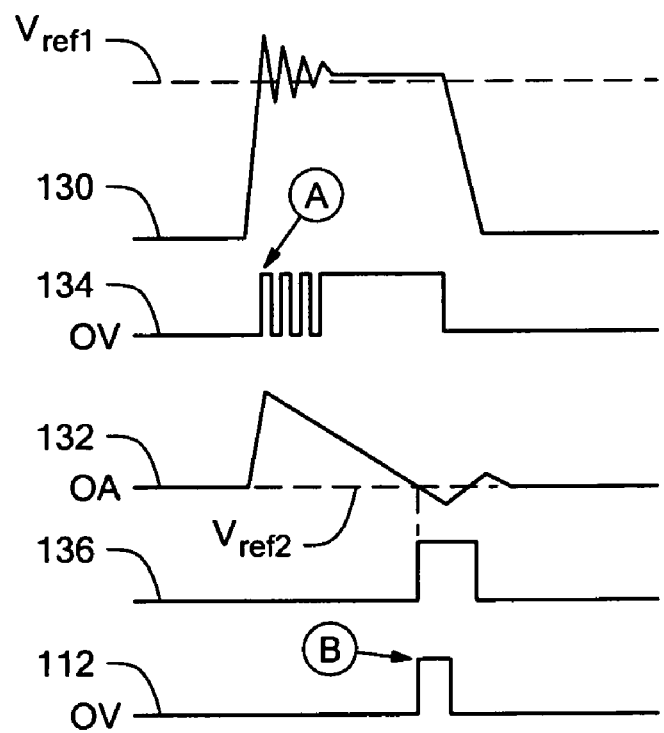
FIG. 2B shows several waveforms associated with the charging circuit of FIG. 2 when the output voltage has reached the desired level.

Referring also to FIG. 2B, the same waveforms as in FIG. 2A are shown. Here however, the output voltage has reached the desired level as indicated by the switch voltage 130 exceeding the reference voltage Vref1. Thus, the output signal 134 of comparator 114 transitions in response to the voltage spikes at time A and then stays high once the voltage spikes have dissipated. At a later time, here time B, the capacitor current Icap 132 reduces to small value such that the output signal 136 of comparator 122 goes high. Since the output signal 134 of comparator 114 is also high at time B, the output signal 112 of the AND gate 118 goes high, as shown.

With this arrangement, the voltage spikes that typically occur on the switch voltage Vsw when switch 22 turns off are prevented from affecting the control signal 112 and the charge done signal Vcd, 138. This is because, the control signal 112 can go high, indicating that the output voltage has reached the desired level, only when the capacitor current becomes very small, by which time the ringing causing the voltage spikes will have dissipated. Thus, even if the voltage spikes on the switch voltage 130 cause the output signal 134 of comparator 114 to go high when the output voltage has not reached the desired level, the control signal 112 will not go high since the capacitor current 132 will not have reached the desired small value.

It will be appreciated that while the circuit 110 is responsive to the voltage across resistor 36, other schemes for sensing the output capacitor current, or the secondary winding current may be used to provide an input to comparator 122 in order to determine when the capacitor current reduces to a desired small value.

Figure 3:
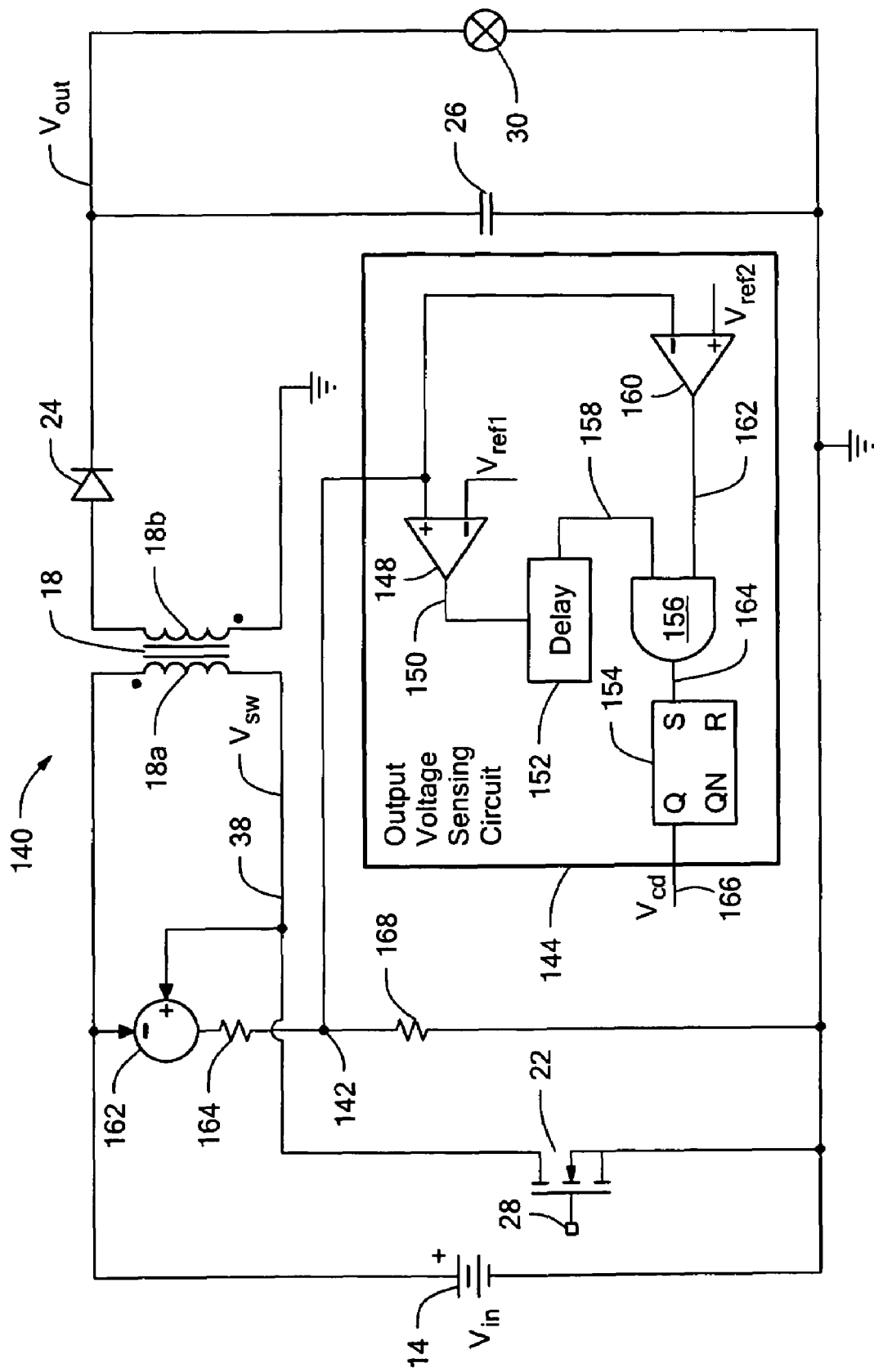
FIG. 3 is a schematic of a still further alternative embodiment of the capacitor charging circuit of FIG. 1 having a further alternative primary side output voltage sensing circuit.

Referring to FIG. 3, an alternative capacitor charging circuit embodiment 140 is shown, in which like reference numbers refer to like elements. Circuit 140 thus includes input voltage source 14, transformer 18, switch 22, switch control circuit 28 (again, simplified for ease of illustration), diode 24, and output capacitor 26. Circuit 140 differs from the charger 80 of FIG. 2 in that circuit 140 includes a further alternative output voltage sensing circuit 144. Like the output voltage sensing circuits 40 and 110 of FIGS. 1 and 2, respectively, circuit 144 senses the output voltage from the primary side of the transformer 18 in a manner that ensures that incorrect sensing does not occur in response to voltage spikes occurring on the switch voltage Vsw when switch 22 turns off.

Output voltage sensing circuit 144 includes a summing element 162 and a level shifter in the form of a resistor divider comprising resistors 164 and 168. The summing element 162 has a non-inverting input coupled to the circuit node 38, an inverting input coupled to the input voltage source Vin, and an output coupled to resistor 164. The voltage at the junction of resistors 164 and 168 (i.e., at node 142) is proportional to the output voltage Vout when the switch 22 is off.

The output voltage sensing circuit 144 further includes and a first comparator 148 having a non-inverting input coupled to node 142 at the junction between resistors 164 and 168, an inverting input adapted to receive a reference voltage Vref1, and provides an output signal 150. The reference voltage Vref1 is selected to correspond, via the transformer turns ratio, to a desired fully-charged level for the output voltage Vout. In one illustrative embodiment, the desired output voltage is 300V and the reference voltage Vref1 is equal to 5 volts or Vin. The comparator output signal 150 is coupled to a delay element 152 that delays the comparator output signal to provide delayed signal 158 to an AND gate 156.

A second comparator 160 has an inverting input coupled to node 142 at the junction between resistors 164 and 168, a non-inverting input adapted to receive a second reference voltage Vref2, and provides an output signal 162 to a second input of AND gate 156, as shown. The output signal 164 of AND gate 156 provides a control signal 164 that indicates that the output voltage Vout has reached the desired level when both of the following conditions are true: (a) a delay has occurred since the output voltage Vout has reached the desired level as established by reference voltage Vref1 and (b) the capacitor 26 is fully charged for a given switch cycle as is established by the combination of delay element 152 and reference voltage Vref2, as will become apparent from consideration of FIGS. 3A and 3B. The control signal 164 sets a latch 154, the output of which provides a "charge done" signal Vcd, 166 in the form of a pulse to indicate a fully charged capacitor condition only in response to one edge of control signal 164, such as the rising edge. In one illustrative embodiment, the charger 140 shuts down when the charge done signal Vcd, 166 goes high indicating that the capacitor 26 is fully charged.

Figure 3A:
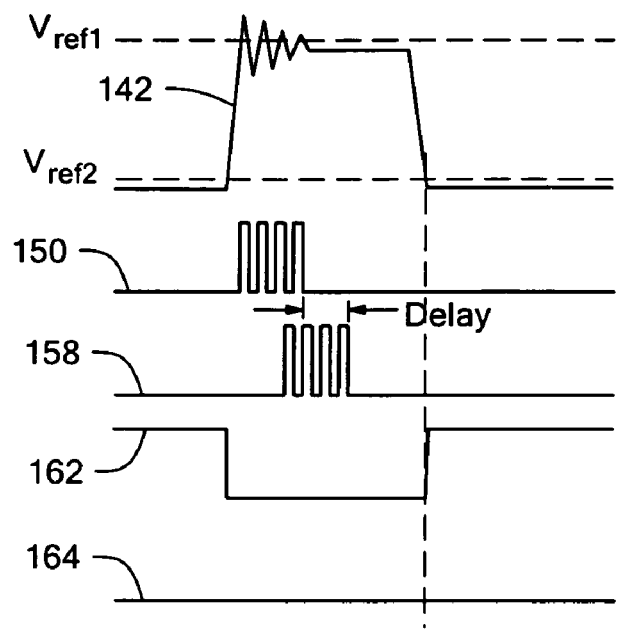
FIG. 3A shows several waveforms associated with the charging circuit of FIG. 3 when the output voltage has not yet reached the desired level.

Referring to FIG. 3A, certain waveforms associated with the circuit 140 are shown to illustrate operation of the voltage sensing circuit 144 when the output voltage Vout has not reached the desired level. Waveform 142 shows the level-shifted switch voltage Vsw at node 142 in relation to the reference voltages Vref1 and Vref2. Waveform 150 shows the output signal of comparator 148, waveform 158 shows the output signal of delay element 152, waveform 162 shows the output signal of comparator 160 and waveform 164 shows the control signal at the output of AND gate 156.

In operation, when the level-shifted switch voltage at node 142 reaches the level of reference voltage Vref1, comparator output signal 150 goes high. Here, even though the output voltage Vout has not reached the desired level, the voltage spikes occurring at node 142 when the switch turns off cause the output signal 150 of comparator 148 to transition several times, as shown.

Once the level-shifted switch voltage at node 142 falls to below the second reference voltage Vref2, the output signal 162 of comparator 160 goes high, as shown. Only when both the delayed signal 158 and the comparator output signal 162 are high does the output signal 164 of AND gate 156 go high. Here, since the delayed signal 158 and the comparator output signal 162 are not both high at the same time, the control signal 164 remains low, thereby accurately indicating that the output voltage Vout has not reached the desired voltage level.

Figure 3B:
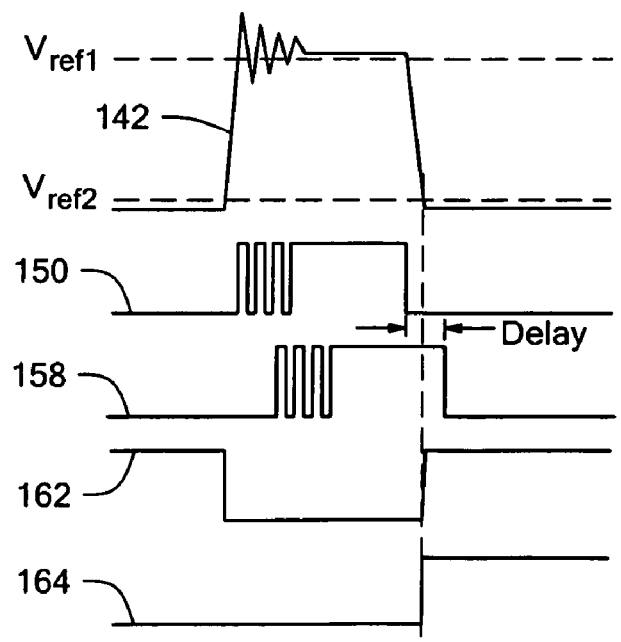
FIG. 3B shows several waveforms associated with the charging circuit of FIG. 3 when the output voltage has reached the desired level.

Referring also to FIG. 3B, the same waveforms as in FIG. 3A are shown. Here however, the output voltage Vout has reached the desired level. Thus, the output signal 150 of comparator 148 transitions several times as a result of the voltage spikes on the switch voltage crossing the reference voltage Vref1 and then stays high once the voltage spikes have dissipated. Here, however, when the switch voltage falls and crosses the reference voltage Vref2, causing the output signal 162 of comparator 160 to go high, the output signal 164 of AND gate 156 also goes high, as shown, thereby accurately indicating that the output voltage Vout has reached the desired level.

The delay provided by delay element 152 is selected to correspond to at least the time it takes the level-shifted switch voltage at node 142 to fall from its plateau to reference voltage Vref2. However, the delay should be short enough to prevent the voltage spikes at the node 142 from erroneously resulting in an indication that the capacitor is fully charged. In one illustrative embodiment, the delay element 152 provides a delay on the order of between 60 and 150 nanoseconds, such as 100 nanoseconds. Conventional circuit simulation techniques can be used to refine the optimal delay.

Figure 4:
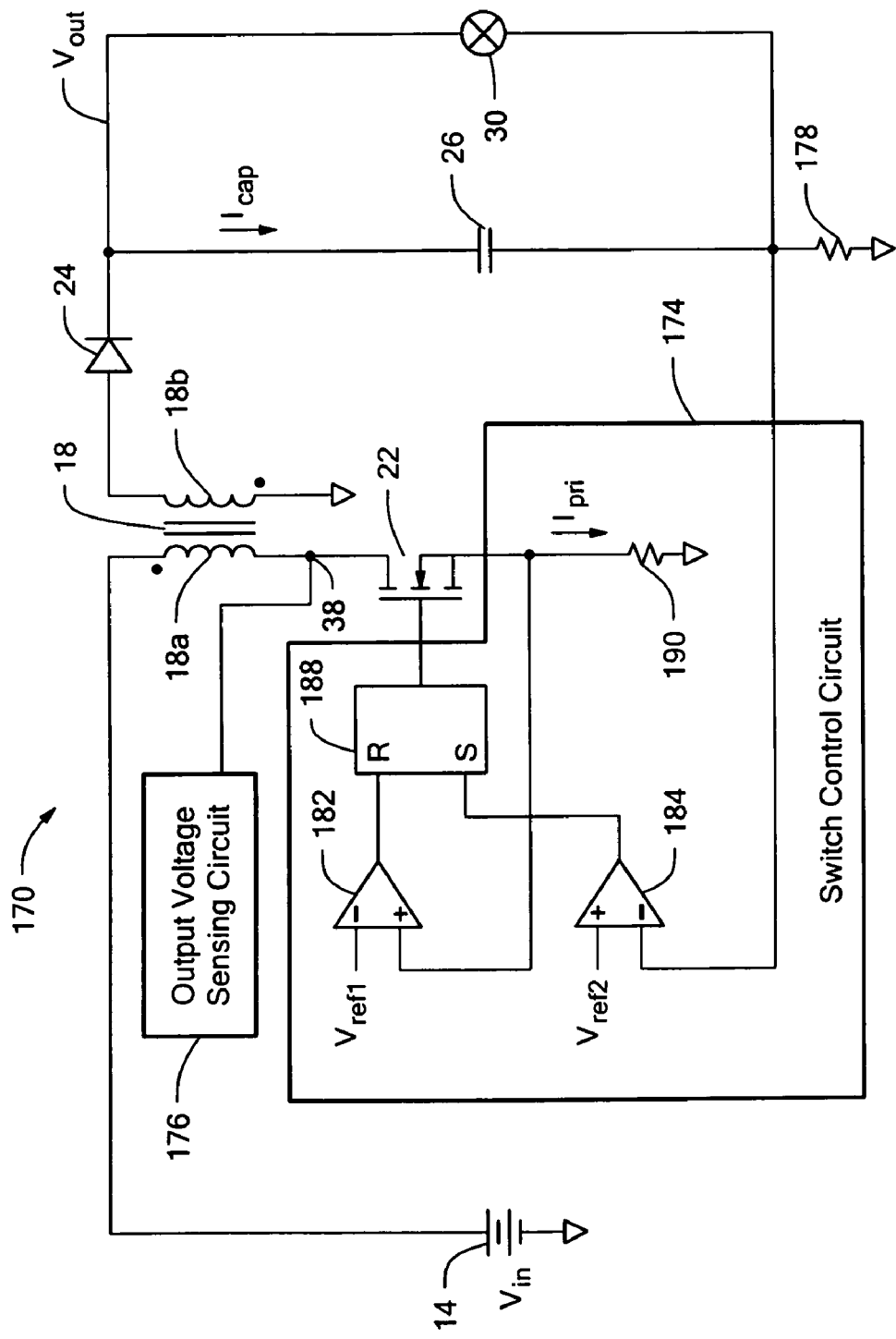
FIG. 4 is a schematic of a capacitor charging circuit including a circuit for sensing the output capacitor current according to a further aspect of the invention and a switch control circuit responsive to the sensed output capacitor current.

Referring to FIG. 4, a further alternative capacitor charging circuit 170 is shown in which like reference numbers refer to like elements. Circuit 170 includes input voltage source 14, transformer 18, switch 22, diode 24, and capacitor 26 coupled to a load 30, as shown. The circuit 170 includes an output voltage sensing circuit 176 coupled to the switch node 38, as may take the form of any of the circuits 40, 110, and 144 of FIGS. 1, 2, and 3, respectively, as examples.

Charger 170 also includes a resistor 178 coupled in series with the capacitor 26 in order to sense the capacitor current Icap and a switch control circuit 174. Switch control circuit 174 provides an alternative switch control scheme to the circuit 28 described above in conjunction with FIG. 1. Here, an on time portion of each switch cycle is controlled in response to sensed primary winding current and an off time portion is controlled in response to sensed output capacitor current Icap. The output capacitor current is sensed with resistor 178 coupled between the output capacitor 26 and ground, as shown.

It will be appreciated by those of ordinary skill in the art that the output capacitor current Icap may be sensed for reasons other than, or in addition to, use by the switch control circuit 174. One such reason is for use by an output voltage sensing circuit, as described and shown in conjunction with FIG. 2 for example. Another reason for sensing the capacitor current is for use by the circuit of FIG. 6 for speeding up the capacitor charging, as will be described.

The switch control circuit 174 includes a first comparator 182 having an inverting input adapted to receive a reference voltage Vref1 and a non-inverting input coupled to a resistor 190. The voltage across resistor 190 is proportional to the primary winding current Ipri. Thus, the output signal of comparator 182 is at a high logic level when the primary winding current Ipri is greater than a first predetermined current level as set by reference voltage Vref1 and a low logic level when the primary winding current Ipri is less than the first predetermined level.

The switch control circuit 174 further includes a second comparator 184 having a non-inverting input adapted to receive a reference voltage Vref2 and an inverting input coupled to resistor 178, as shown. Thus, the output signal of comparator 184 is at a low logic level when the output capacitor current Icap is greater than a second predetermined current level as set by reference voltage Vref2 and a high logic level when the output capacitor current Icap is less than the second predetermined level.

The output signal of comparator 182 is coupled to the reset input of a flip-flop or latch 188 and the output signal of comparator 184 is coupled to the set input of latch 188, as shown. The output signal of latch 188 provides the control signal to the gate of switch 22.

In operation, when the primary winding current Ipri reaches the first predetermined level, as established by reference voltage Vref1, the latch 188 is reset and the switch 22 is turned off. Once the output capacitor current Icap falls to below the second predetermined level, as established by reference voltage Vref2, latch 188 is set and the switch 22 turns on. By proper selection of the reference voltage Vref2, the circuit 170 can be made to operate in the boundary condition between continuous and discontinuous operation.

The above-described switch control circuit 174 provides an efficient scheme for charging the capacitive load 30, particularly in the illustrative photoflash charger application in which a wide voltage range is required by the load. Furthermore, this scheme achieves efficient performance with simplified circuitry than heretofore used. This is because of the use of the resistor 178 coupled to the output capacitor 26 to sense the capacitor current. In the above-referenced U.S. Pat. No. 6,518,733, a negative voltage is compared to a reference voltage because of the direction of the secondary current through the sense resistor.

Figure 5:
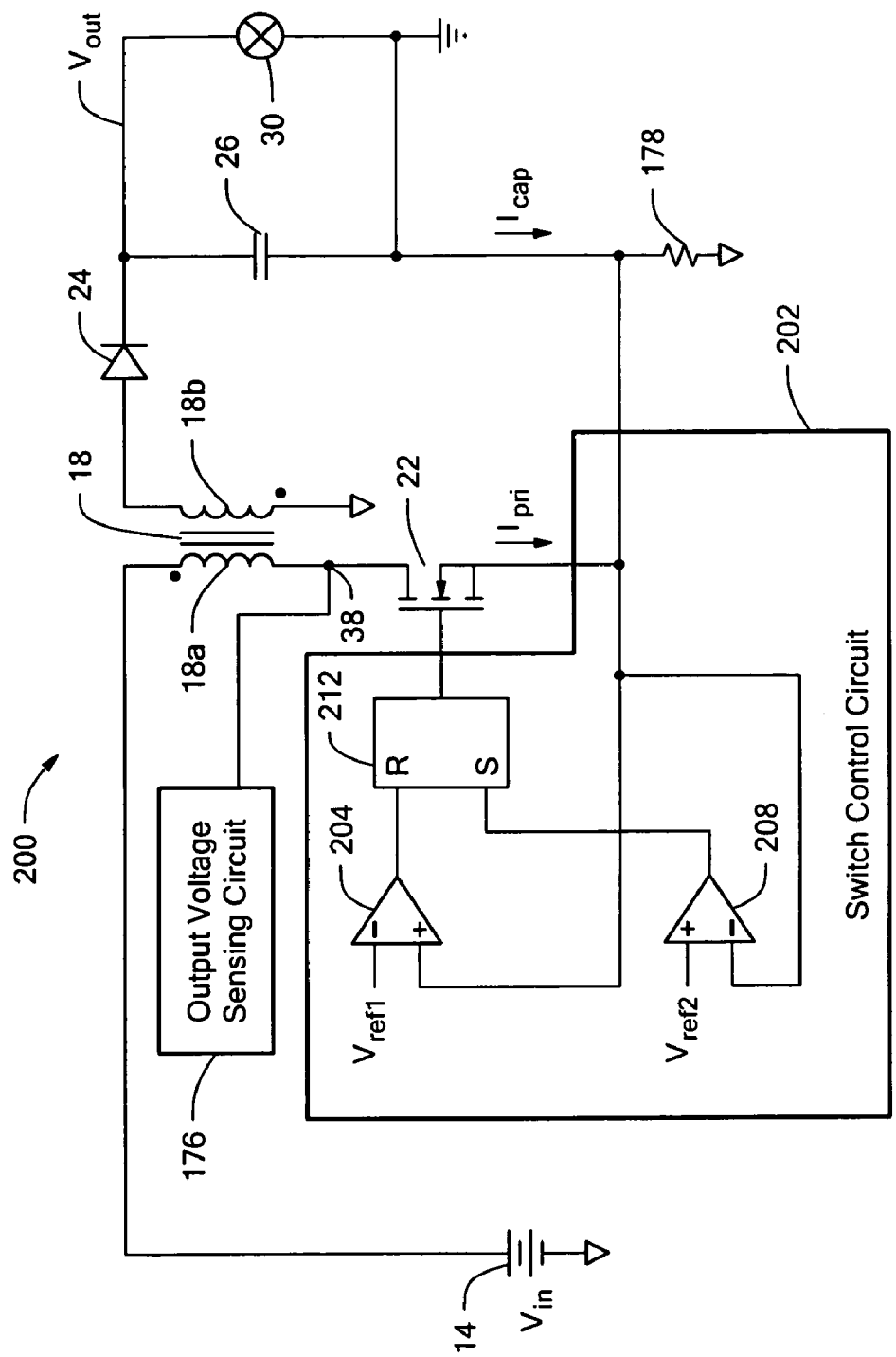
FIG. 5 is a schematic of an alternative embodiment of the capacitor charging circuit of FIG. 4 including the circuit sensing the output capacitor current and an alternative switch control circuit responsive to the sensed output capacitor current.

Referring also to FIG. 5, an alternative charging circuit embodiment 200 is shown, in which like reference numbers refer to like components. Thus, circuit 200 includes an input voltage source 14, a transformer 18, a switch 22, a diode 24, and an output capacitor 26, coupled as shown. Output voltage sensing circuit 176 is also shown.

The charging circuit 200 also includes resistor 178 coupled between the output capacitor 26 and ground and across which is provided a voltage indicative of the current through the output capacitor Icap. Here, as in the embodiment of FIG. 4, the output capacitor current is sensed for use by the switch control circuit.

The charging circuit 200 differs from the circuit 170 of FIG. 4 in the switch control circuit 202. Switch control circuit 202 achieves the same type of adaptive rate control as switch control circuit 174, but without requiring resistor 190 (FIG. 4). Thus, here again, an on time portion of each switch cycle is controlled in response to sensed primary winding current Ipri and an off time portion is controlled in response to sensed output capacitor current Icap. When switch 22 is on, the voltage across resistor 178 is indicative of the primary winding current Ipri. This is because when switch 22 is on, secondary current does not flow and so, the only current flowing through the resistor 178 is the primary current Ipri. Whereas, when switch 22 is off, the voltage across resistor 178 is indicative of the output capacitor current Icap.

Switch control circuit 202 includes a first comparator 204 having an inverting input adapted to receive a reference voltage Vref1 and a non-inverting input coupled to resistor 178, as shown. Thus, the output signal of comparator 204 is at a high logic level when the primary winding current Ipri is greater than a first predetermined level as set by reference voltage Vref1 and a low logic level when the primary winding current is less than the first predetermined level.

The switch control circuit 202 further includes a second comparator 208 having a non-inverting input adapted to receive a reference voltage Vref2 and an inverting input coupled to resistor 178, as shown. Thus, the output signal of comparator 208 is at a low logic level when the output capacitor current Icap is greater than a second predetermined level as set by reference voltage Vref2 and a high logic level when the output capacitor current is less than the second predetermined level.

The output signal of comparator 204 is coupled to the reset input of a flip-flop, or latch 212 and the output signal of comparator 208 is coupled to the set input. The output signal of latch 212 is coupled to the gate of switch 22, as shown.

In operation, when the primary winding current reaches the first predetermined level, as established by reference voltage Vref1, the latch 212 is reset and the switch 22 turns off. Once the output capacitor current Icap falls below the second predetermined level, as established by reference voltage Vref2, latch 212 is set and the switch 22 turns on.

Figure 6:
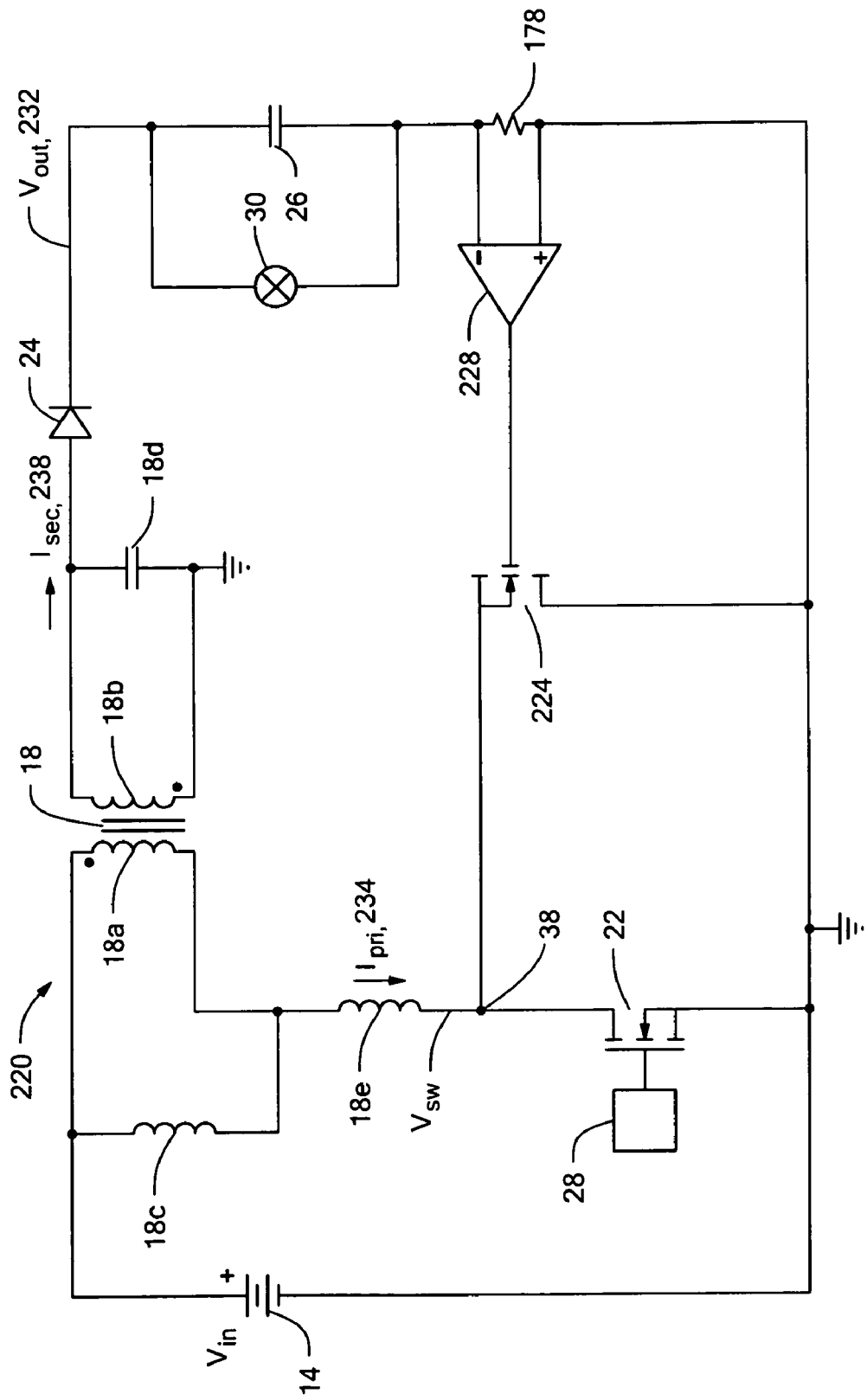
FIG. 6 is a schematic of a capacitor charging circuit including a circuit for reducing the capacitor charge time according to yet anther aspect of the invention.

Referring to FIG. 6, a further alternative capacitor charging circuit 220 is shown, in which like reference numbers refer to like elements. Thus, charger 220 includes input voltage source 14, transformer 18, switch 22, switch control circuit 28 (here simplified for ease of illustration), diode 24, and capacitor 26 coupled to load 30, as shown. It will be appreciated that switch control circuit 28 may alternatively be provided by one of the circuits 174 and 202, as described in conjunction with FIGS. 4 and 5, respectively.

Circuit 220 further includes an auxiliary switch 224, here provided as a MOSFET device, and associated circuitry provided to reduce the reverse recovery time of the diode 24 and speed up the discharge of the secondary winding parasitic capacitance. Models of the flyback transformer 18, including parasitic elements of the transformer 18 are also shown in FIG. 6 in order to illustrate the advantages of the auxiliary switch 224. Specifically, the transformer magnetizing inductance 18c, effective parasitic capacitance 18d, and leakage inductance 18e are shown.

The reason that it is desirable to reduce the diode reverse recovery time is because during the reverse recovery time, the current through the parasitic capacitance and diode reflected to the primary side (i.e., since switch 22 is off, this current mainly flows through magnetizing inductance 18c) causes a negative current to flow through the magnetizing inductance 18c (a current that flows clockwise in 18c and 18a loop in FIG. 6) and thus a negative initial switch current when switch 22 turns on. The magnitude of the negative primary current swing increases with the output voltage. The negative switch current limits the minimum switch cycle and thus slows down charging of the capacitor 26. By reducing the diode reverse recovery time, the negative initial current is reduced and the switching cycles become shorter and thus, the capacitor 26 is charged faster than otherwise possible. For example, use of the auxiliary switch 224 can reduce the capacitor charging time by on the order of 6%-8%.

Auxiliary switch 224 is coupled in parallel with the main switch 22, so that the drain of the switch 224 is coupled to the drain of switch 22 and the source of switch 224 is coupled to the source of switch 22 and to ground. When switch 224 is on, the switch node 38 is coupled to ground through switch 224. When switch 224 is off, the switch 224 is decoupled from the switch node 38. The gate of switch 224 is coupled to the output of a comparator 228. The switch 224 is selected to have a higher Rdson and lower capacitance than the main switch 22 in order to have a faster response than the switch 22.

Comparator 228 has an inverting input coupled to the output capacitor current sense resistor 178 and a non-inverting input coupled to ground, as shown. When the output capacitor current Icap falls below zero amps, the output of comparator 228 goes high, thereby turning on auxiliary switch 224. This is the beginning of the diode recovery interval.

When switch 224 is on, the current Ipri, reflected from the current that flows through the secondary winding 18b of the transformer due to the diode recovery time, flows through switch 224 to ground. This leads to a faster collapse of the switch voltage Vsw at node 38 and allows the initiation of the next switch cycle to occur with shorter delay, thereby reducing the overall charging time for capacitor 26.

Figure 6A:
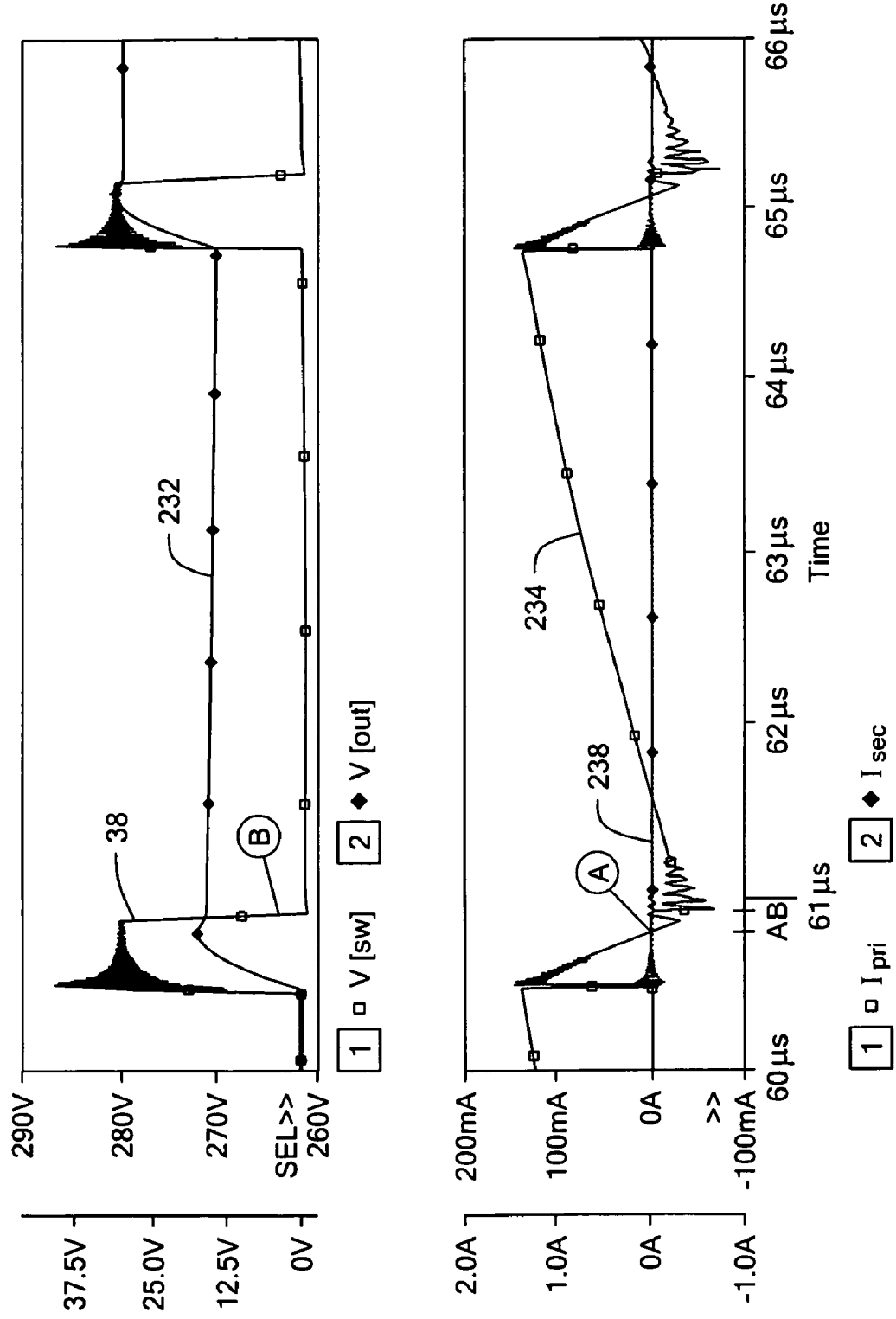
FIG. 6A shows several waveforms associated with a charging circuit substantially similar to the charging circuit of FIG. 6, but without the auxiliary switch.

Referring to FIGS. 6A, various waveforms are provided to illustrate the advantages of the auxiliary switch 224 by showing operation of a circuit like circuit 220 of FIG. 6, but with the auxiliary switch 224 removed. That is, the waveforms 38, 232, 234, and 238 in FIG. 6A illustrate operation of the circuit 220 without the use of auxiliary switch 224. Specifically, waveform 38 shows the switch voltage Vsw at node 38, waveform 232 shows the output voltage Vout, waveform 234 shows the primary current Ipri that flows through the transformer leakage inductance 18e, and waveform 238 shows the secondary current Isec.

As is apparent, when the secondary current Isec, 238 reaches zero amps, at a time A, and the switch 22 is turned on, it takes on the order of 114 nanoseconds for the diode 24 to recover and thus for the switch voltage at node 38 to fall to the input voltage level, at a time B, so that positive primary current can begin to flow. This 114 nanosecond reverse recovery interval during each cycle, plus the time for the primary current Ipri to ramp from the peak negative current to zero, limits the minimum switch cycle or, alternatively the maximum switching frequency and thus slows down the charging of the output capacitor 26. With the switch 224 omitted from the circuit 220, it takes on the order of 76 μs to fully charge the capacitor 26.

Figure 6B:
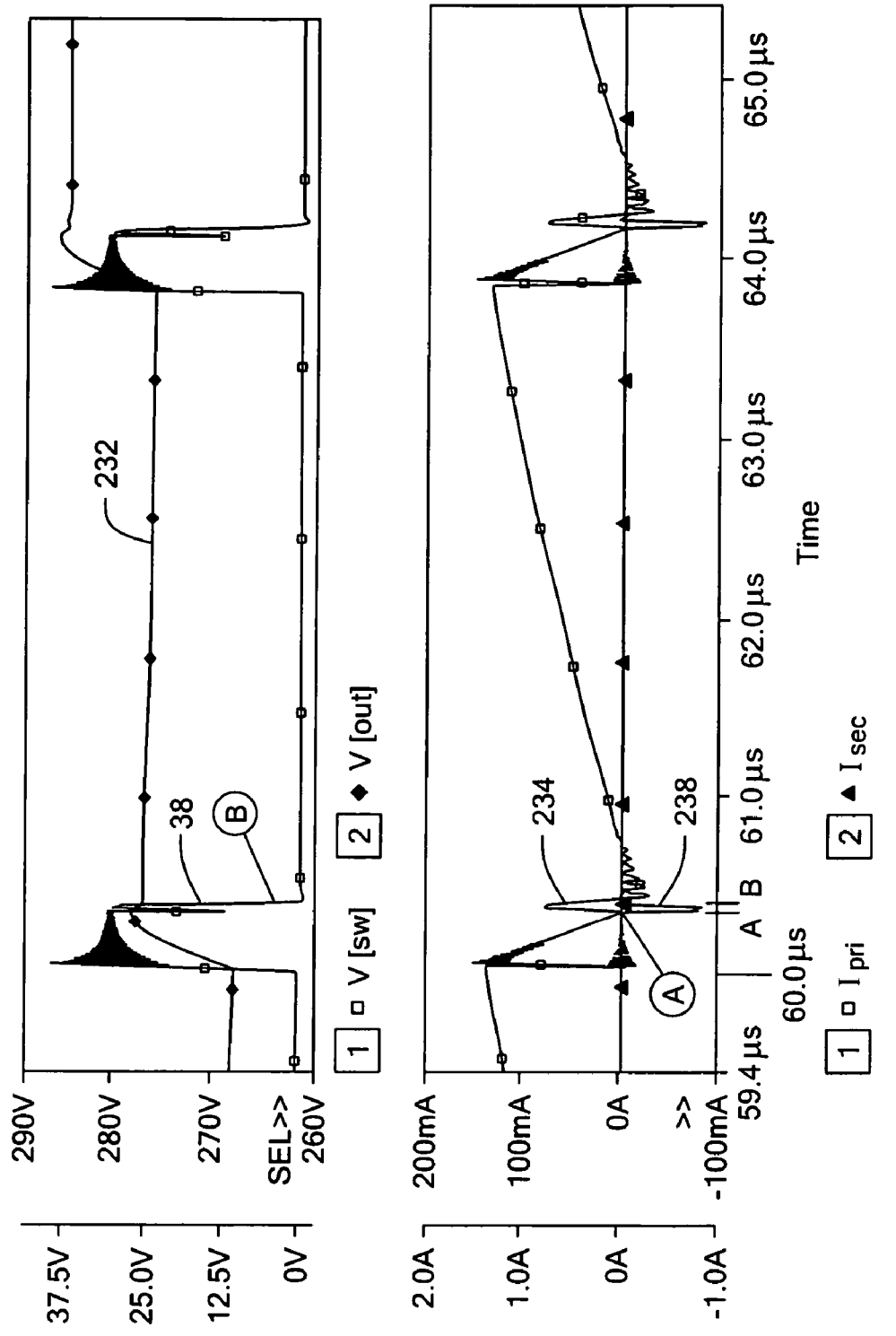
FIG. 6B shows several waveforms associated with the charging circuit of FIG. 6 with the auxiliary switch.

Referring also to FIG. 6B, waveforms 38, 232, 234, and 238 illustrate operation of the circuit 220 with the auxiliary switch 224 functioning as described above. Specifically, waveform 38 shows the switch voltage at node 38, waveform 232 shows the output voltage, waveform 234 shows the primary current Ipri that flows through the transformer leakage inductance 18e, and waveform 238 shows the secondary current Isec. With the use of auxiliary switch 224 operating as described above, when the secondary current 238 reaches zero amps, at a time A, the auxiliary switch 224 are turned on with sufficient speed. A higher magnitude of recovery current flows through the secondary winding, which in turn reduces the recovery time, leading to faster collapse of switch node voltage and lower negative primary current swing. In particular, it takes only on the order of 58 nanoseconds for the diode 24 to recover and thus for the voltage at node 38 to fall to the input voltage level, at a time B, so that primary current can begin to flow from a smaller negative current. Thus, the auxiliary switch 224 reduces each switch cycle, thereby reducing the time it takes to charge capacitor 26 as compared to a circuit without the auxiliary switch. With this arrangement, the capacitor 26 charges faster, such as on the order of 6%-8% faster in one illustrative embodiment. With the use of auxiliary switch 224 in circuit 220, it takes only on the order of 70 μs to fully charge the capacitor 26.

Having described the preferred embodiments of the invention, it will now become apparent to one of ordinary skill in the art that other embodiments incorporating their concepts may be used.

For example, it will be appreciated by those of ordinary skill in the art that the different inventive features described herein may be combined for use in a capacitor charging circuit or alternatively, may be used selectively and individually. For example, the output voltage sensing circuits 40, 110, and 144 of FIGS. 1, 2, and 3, respectively, may be used alone in otherwise conventional capacitor charging circuits or alternatively, may be used in a charging circuit that also incorporates other inventive concepts discussed herein, such those discussed in conjunction with FIGS. 4-6.

It will also be appreciated that while particular circuit elements and even logic signal levels have been described in order to explain the inventive concepts, the embodiments of the invention should not be limited to the disclosed embodiments, but rather should be limited only by the spirit and scope of the appended claims.

What is claimed is:

1. Apparatus for measuring the output voltage of a capacitor charging circuit having a transformer with a primary winding coupled to a switch and a secondary winding coupled to an output capacitor across which the output voltage of the capacitor charging circuit is provided, comprising:
   a filter coupled to the switch to filter a voltage at the switch and at the primary winding to provide a filtered signal; and
   a comparator having a first input responsive to the filtered signal, a second input coupled to a reference voltage, and an output at which is provided a control signal indicative of whether the output voltage of the capacitor charging circuit across the output capacitor has increased to a desired level.

2. The apparatus of claim 1 wherein the filter comprises a resistor and a capacitor.

3. The apparatus of claim 1 further comprising a sample and hold circuit coupled to the filter to provide a DC voltage having a level substantially equal to the peak voltage of the filtered signal, wherein the DC voltage is coupled to the first input of the comparator.

4. The apparatus of claim 3 wherein the sample and hold circuit comprises a diode and a capacitor.

5. The apparatus of claim 1 further comprising a level shifter coupled between the switch and the filter for shifting the level of the switch voltage.

6. The apparatus of claim 5 wherein the level shifter comprises a resistor divider.

* * * * *

UNITED STATES PATENT AND TRADEMARK OFFICE
CERTIFICATE OF CORRECTION

| | |
|---|---|
| PATENT NO. | : 7,646,616 B2 |
| APPLICATION NO. | : 11/125300 |
| DATED | : January 12, 2010 |
| INVENTOR(S) | : Shashank Wekhande et al. |

It is certified that error appears in the above-identified patent and that said Letters Patent is hereby corrected as shown below:

Column 3, line 10, delete "anther" and replace with --another--.

Column 7, lines 55-56, delete "and a" and replace with --a--.

Column 11, line 39, delete "FIGS. 6A," and replace with --FIG. 6A,--.

Column 12, line 4, delete "are" and replace with --is--.

Column 12, line 30, delete ", such those" and replace with --, such as those--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.       : 7,646,616 B2  Page 1 of 1
APPLICATION NO. : 11/125300
DATED            : January 12, 2010
INVENTOR(S)      : Wekhande et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this

Sixteenth Day of November, 2010

David J. Kappos
*Director of the United States Patent and Trademark Office*